United States Patent
Ikuta (10) Patent No.: US 11,487,103 B2
(45) Date of Patent: Nov. 1, 2022

(54) ELECTROWETTING DEVICE

(71) Applicant: Sharp Kabushiki Kaisha, Sakai (JP)

(72) Inventor: Kei Ikuta, Yonago (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 368 days.

(21) Appl. No.: 16/774,556

(22) Filed: Jan. 28, 2020

(65) Prior Publication Data

US 2020/0241282 A1 Jul. 30, 2020

Related U.S. Application Data (60) Provisional application No. 62/798,204, filed on Jan. 29, 2019.

(51) Int. Cl.
*G02B 26/00* (2006.01)

(52) U.S. Cl.
CPC .................... *G02B 26/005* (2013.01)

(58) Field of Classification Search
CPC ............... G02B 26/005; G02B 26/004; G02B 21/0076; G02B 2207/115; G02B 26/001; G02B 6/003; G02B 6/0051; G02B 2006/0325; G02B 26/08; G02B 3/12; G02B 6/0229; G02B 6/122; G09G 3/348; G09G 2230/00; G09G 2300/0857; G09G 2300/0842; G09G 2300/0852; G09G 2310/0251; G09G 2300/0421; G09G 2300/0809; G09G 2310/0208; G09G 2310/0294; G09G 2310/062; G09G 2320/0295; G09G 2330/12; G09G 3/006; G09G 2300/0819; G09G 2320/0693
See application file for complete search history.

(56) References Cited

U.S. PATENT DOCUMENTS

2013/0062205 A1 * 3/2013 Hadwen ............ B01L 3/502784
204/601

FOREIGN PATENT DOCUMENTS

JP 2013-078758 A 5/2013

* cited by examiner

*Primary Examiner* — Brandi N Thomas
(74) *Attorney, Agent, or Firm* — ScienBiziP, P.C.

(57) ABSTRACT

An electrowetting device has an active matrix substrate including a plurality of first electrodes arrayed in a matrix shape, a plurality of TFTs, a plurality of first wiring lines extending along a row direction, and a plurality of second wiring lines extending along a column direction. The plurality of TFTs are disposed so as to have at least one of first and second relative arrangements. The first relative arrangement is a relative arrangement where two or more TFTs that are connected to any one of the plurality of first wiring lines alternately include, along the row direction: TFTs that are connected to the first electrodes belonging to one of a pair of rows adjoining the one first wiring line; and TFTs that are connected to the first electrodes belonging to the other row. The second relative arrangement is a relative arrangement where two or more TFTs that are connected to any one of the plurality of second wiring lines alternately include, along the column direction: TFTs that are connected to the first electrodes belonging to one of a pair of columns adjoining the one second wiring line; and TFTs that are connected to the first electrodes belonging to the other column.

8 Claims, 11 Drawing Sheets

ELECTROWETTING DEVICE

CROSS REFERENCE TO RELATED APPLICATIONS

This application claims priority to U.S. Provisional Patent Application No. 62/798,204, entitled "ELECTROWETTING DEVICE", filed on Jan. 29, 2019, the content of which is incorporated herein by reference.

BACKGROUND

1. Technical Field

The present invention relates to an electrowetting device.

2. Description of the Related Art

In recent years, electrowetting devices (also referred to as microfluidic devices or droplet devices) have been under development. Electrowetting is a phenomenon where a droplet that is placed on a hydrophobic dielectric layer, which is provided above an electrode, changes its angle of contact with respect to the dielectric layer in response to an electric field being applied thereto. By way of electrowetting, minute droplets, e.g., those in sub-microliter amounts, can be manipulated. Since electrowetting devices are often referred to as EWODs (Electrowetting on Dielectric Devices) in English, they may hereinafter be designated as EWODs for conciseness.

Japanese Laid-Open Patent Publication No. 2013-78758 discloses an active matrix type EWOD (also referred to as an "AM-EWOD") in which an EWOD is driven by a thin-film electronic circuit (hereinafter also referred to as a "TFT circuit") that includes thin film transistors (TFT).

SUMMARY

In an active matrix type EWOD, when any of a plurality of wiring lines for supplying control signals to the TFTs happens to break, voltage application to the electrode cannot occur from any TFT that is connected to the broken wiring line (which will hereinafter be referred to as a "defective line"). As a result, the region associated with that electrode cannot be changed from being hydrophobic to being hydrophilic. This hinders movements of the droplet because the droplet cannot move astride the defective line.

The present invention has been made in view of the above problem, and an objective thereof is to provide an electrowetting device in which a droplet can be moved astride a defective line.

The present specification discloses electrowetting devices as recited in the following Items.

[Item 1]
An electrowetting device comprising:
an active matrix substrate; and
a counter substrate opposed to the active matrix substrate via a predetermined gap,
the active matrix substrate including:
a first substrate;
a plurality of first electrodes disposed on the first substrate, the plurality of first electrodes being arranged in a matrix shape including a plurality of rows and a plurality of columns;
a plurality of TFTs respectively connected to the plurality of first electrodes; and
a first hydrophobic layer disposed on the plurality of first electrodes,
the counter substrate including:
a second substrate;
a second electrode disposed on the second substrate; and
a second hydrophobic layer disposed on the second electrode,
the active matrix substrate further including:
a plurality of first wiring lines extending along a row direction, the plurality of first wiring lines being connected to the plurality of TFTs; and
a plurality of second wiring lines extending along a column direction, the plurality of second wiring lines being connected to the plurality of TFTs, wherein,
the plurality of TFTs are disposed so as to have at least one of a first relative arrangement and a second relative arrangement,
the first relative arrangement being defined as a relative arrangement where two or more TFTs that are connected to any one of the plurality of first wiring lines alternately include, along the row direction: TFTs that are connected to the first electrodes belonging to one of a pair of rows adjoining the one first wiring line; and TFTs that are connected to the first electrodes belonging to the other row;
the second relative arrangement being defined as a relative arrangement where two or more TFTs that are connected to any one of the plurality of second wiring lines alternately include, along the column direction: TFTs that are connected to the first electrodes belonging to one of a pair of columns adjoining the one second wiring line; and TFTs that are connected to the first electrodes belonging to the other column.

[Item 2]
The electrowetting device of Item 1, wherein,
each of the plurality of TFTs includes a gate electrode, a source electrode, and a drain electrode; and
the plurality of first wiring lines are a plurality of row selection lines that are connected to the gate electrodes of the plurality of TFTs, and the plurality of second wiring lines are a plurality of column write lines that are connected to the source electrodes of the plurality of TFTs.

[Item 3]
The electrowetting device of Item 1 or 2, wherein the plurality of TFTs are disposed so as to have only one of the first relative arrangement and the second relative arrangement.

[Item 4]
The electrowetting device of Item 1 or 2, wherein the plurality of TFTs are disposed so as to have both of the first relative arrangement and the second relative arrangement.

[Item 5]
The electrowetting device of any of Items 1 to 4, wherein,
the plurality of first electrodes are disposed in each row with a predetermined first pitch P1, and disposed in each column with a predetermined second pitch P2; and
the plurality of first electrodes are disposed in such a manner that the first electrodes belonging to any odd-numbered row and the first electrodes belonging to any even-numbered row are mutually shifted along the row direction by a distance which is shorter than the first pitch P1, or that the first electrodes belonging to any odd-numbered column and the first electrodes belonging to any even-numbered column are mutually shifted along the column direction by a distance which is shorter than the second pitch P2.

[Item 6]

An electrowetting device comprising:

an active matrix substrate; and a counter substrate opposed to the active matrix substrate via a predetermined gap, the active matrix substrate including:

a first substrate;

a plurality of first electrodes disposed on the first substrate;

a plurality of TFTs respectively connected to the plurality of first electrodes; and a first hydrophobic layer disposed on the plurality of first electrodes, the counter substrate including:

a second substrate;

a second electrode disposed on the second substrate; and a second hydrophobic layer disposed on the second electrode, the active matrix substrate further including:

a plurality of first wiring lines extending along a row direction, the plurality of first wiring lines being connected to the plurality of TFTs; and a plurality of second wiring lines extending along a column direction, the plurality of second wiring lines being connected to the plurality of TFTs, wherein, the plurality of first electrodes are disposed in such a manner that any two adjacent first electrodes neighboring along a row direction, a column direction, or an oblique direction that is inclined with respect to the row direction and the column direction partially overlap each other via an insulating layer.

[Item 7]

The electrowetting device of Item 6, wherein the plurality of first electrodes are disposed in such a manner that any two adjacent first electrodes neighboring along the row direction or the column direction partially overlap each other via the insulating layer.

[Item 8]

The electrowetting device of Item 6, wherein the plurality of first electrodes are disposed in such a manner that any two adjacent first electrodes neighboring along the oblique direction partially overlap each other via the insulating layer.

According to an embodiment of the present invention, an electrowetting device in which a droplet can be moved astride a defective line can be provided.

DETAILED DESCRIPTION

Hereinafter, embodiments of the present invention will be described with reference to the drawings. Note that the present invention is not limited to the following embodiments.

Embodiment 1

Figure 1:
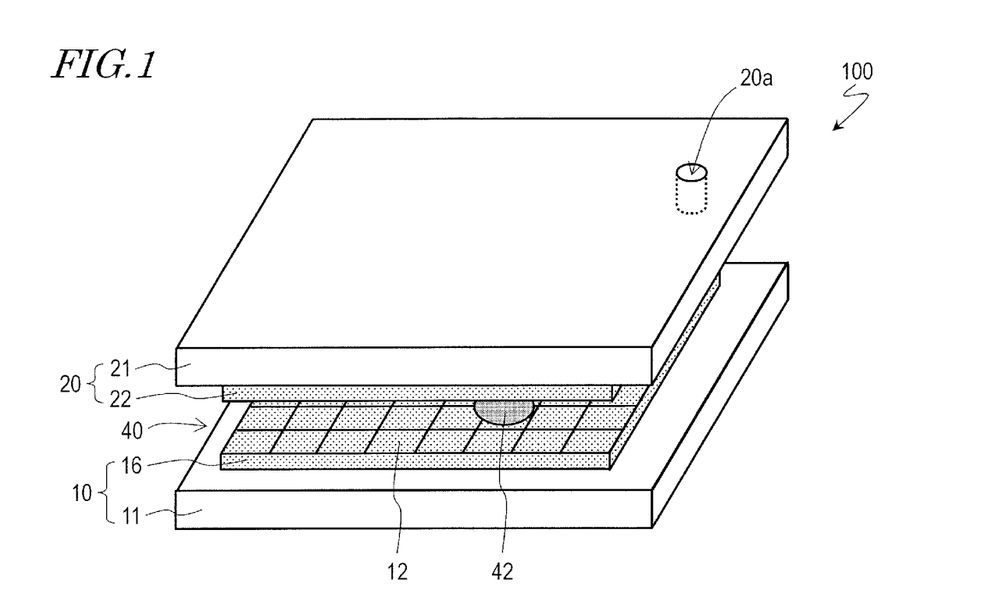
FIG. 1 is a perspective view schematically showing an overall constitution of an active matrix type electrowetting device (AM-EWOD) 100 according to an embodiment of the present invention.
Figure 2:
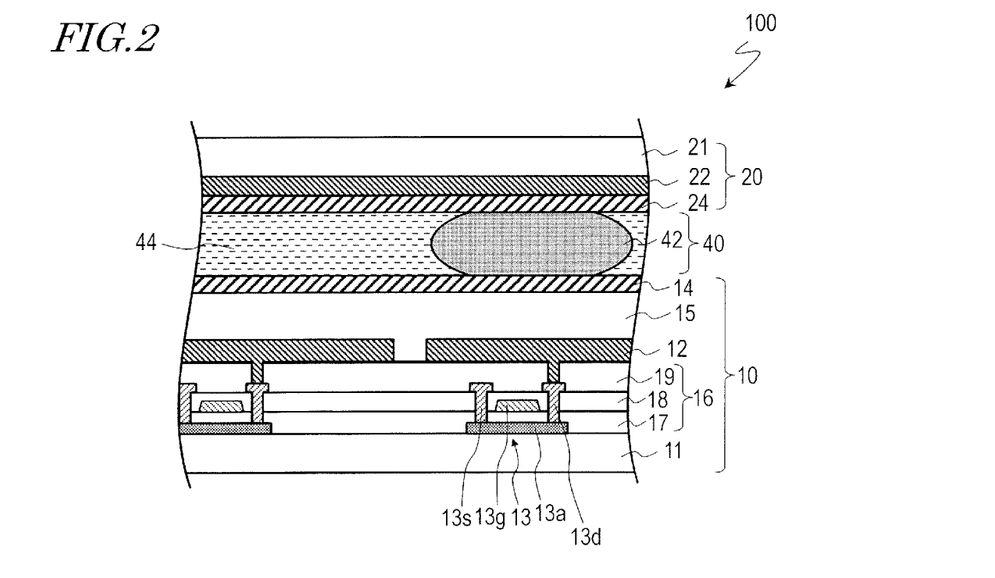
FIG. 2 is a partial cross-sectional view schematically showing the cross-sectional structure of the AM-EWOD 100.

With reference to FIG. 1 and FIG. 2, an active matrix type electrowetting device (AM-EWOD) 100 according to the present embodiment will be described. FIG. 1 is a perspective view schematically showing the overall constitution of the AM-EWOD 100. FIG. 2 is a partial cross-sectional view schematically showing a cross-sectional structure of the AM-EWOD 100.

As shown in FIG. 1 and FIG. 2, the AM-EWOD 100 includes an active matrix substrate (hereinafter referred to as a "TFT substrate") 10 and a counter substrate 20. The counter substrate 20 is opposed to the TFT substrate 10 via a predetermined gap 40.

The TFT substrate 10 includes a substrate 11, a plurality of first electrodes 12, a plurality of TFTs 13, a first hydrophobic layer 14, and a dielectric layer 15. The substrate 11 may be a glass substrate, for example.

The plurality of first electrodes 12 are provided on the substrate 11 (i.e., supported by the substrate 11). The plurality of first electrodes 12 are arranged in a matrix shape including a plurality of rows and a plurality of columns. The plurality of first electrodes 12 are connected to a thin-film electronic circuit (TFT circuit) 16 that includes the plurality of TFTs 13, such that a voltage can be independently supplied to each first electrode 12. Hereinafter, each of the plurality of first electrodes 12 will be referred to as a "unit electrode". Each unit electrode 12 is made of ITO, for example.

The plurality of TFTs 13 are respectively connected to the plurality of unit electrodes 12 (i.e., to the corresponding unit electrodes 12). Each TFT 13 includes a semiconductor layer 13a, a gate electrode 13g, a source electrode 13s, and a drain electrode 13d. Various known semiconductor materials can be used as the material of the semiconductor layer 13a. FIG.

2 illustrates TFTs 13 of top gate structure as an example. The semiconductor layer 13a is formed on the substrate 11. A gate insulating layer 17 is formed so as to cover the semiconductor layer 13a. The gate insulating layer 17 may be an SiN layer, an $SiO_2$ layer, or an SiN layer/$SiO_2$ layer (multilayer structure), for example. The gate electrode 13g is formed on the gate insulating layer 17. An interlayer insulating layer 18 is formed so as to cover the gate electrode 13g. The interlayer insulating layer 18 may be an SiN layer, an $SiO_2$ layer, or an SiN layer/$SiO_2$ layer (multilayer structure), for example. The source electrode 13s and the drain electrode 13d are formed on the interlayer insulating layer 18. The source electrode 13s and the drain electrode 13d are connected to the semiconductor layer 13a, in a contact hole which is formed in the gate insulating layer 17 and the interlayer insulating layer 18.

An interlayer insulating layer 19 is formed so as to cover the TFTs 13. The interlayer insulating layer 19 is made of a photosensitive resin material, for example. Each unit electrodes 12 is formed on the interlayer insulating layer 19. The unit electrode 12 is connected to the drain electrode 13d in a contact hole that is formed in the interlayer insulating layer 19.

The dielectric layer 15 is provided on the plurality of unit electrodes 12. The first hydrophobic layer 14 is provided on the plurality of unit electrodes 12, via the dielectric layer 15. In other words, the dielectric layer 15 is provided between the unit electrodes 12 and the first hydrophobic layer 14. The dielectric layer 15 may be an SiN layer, for example. The first hydrophobic layer 14 may be a fluorine-based resin layer, for example.

The counter substrate 20 includes a substrate 21, a second electrode 22, and a second hydrophobic layer 24. The substrate 21 may be a glass substrate, for example.

The second electrode 22 is provided on the substrate 21 (i.e., supported by the substrate 21). The second electrode 22 is opposed to the plurality of first electrodes 12. Hereinafter, the second electrode 22 will be referred to as a "counter electrode". The counter electrode 22 is made of ITO, for example. The second hydrophobic layer is provided on the counter electrode 22. The second hydrophobic layer 24 may be a fluorine-based resin layer, for example.

A droplet 42 is placed in a gap (channel) 40 that is created between the TFT substrate 10 and the counter substrate 20. The droplet 42 may be injected via a throughhole 20a that is made in the counter substrate 20, for example. There may be a plurality of throughholes 20a, and a plurality of droplets 42. As the droplet(s) 42, an electrically conductive liquid such as an ionic liquid or a polar liquid may be used. For example, as the droplet(s) 42, water, an electrolytic solution (an aqueous solution of an electrolyte), an alcohol, any of various ionic liquids, or may be used. Examples of droplets 42 would include a whole blood sample, a bacterial cell suspension, a protein or antibody solution, various buffer solutions, and the like.

Moreover, a non-electrically conductive liquid 44 that is not miscible with the droplet 42 may be injected into the gap 40. For example, any space within the gap 40 that is not occupied by the droplet 42 may be filled with the non-electrically conductive liquid 44.

As the non-electrically conductive liquid 44, a nonpolar liquid (non-ionic liquid) having a smaller surface tension than that of the droplet 42 can be used. Examples of non-electrically conductive liquids 44 include hydrocarbon-based solvents (low molecular-weight hydrocarbon-based solvents) e.g., decane, dodecane, hexadecane, or undecane; oils such as silicone oil; fluorocarbon-based solvents; and the like. Examples of silicone oils include dimethylpolysiloxane. One kind of non-electrically conductive liquid 44 may be used, or a mixture of a plurality of kinds of non-electrically conductive liquids 44 may be used, as appropriate.

As the non-electrically conductive liquid 44, a liquid having a smaller specific gravity than that of the droplet 42 is chosen. The specific gravity of the droplet 42 and the specific gravity of the non-electrically conductive liquid 44 are not particularly limited, so long as they are of a relationship such that the specific gravity of the non-electrically conductive liquid 44 is smaller than the specific gravity of the droplet 42. For example, in the case where the droplet 42 is an aqueous solution of an electrolyte, the specific gravity of the droplet 42 is essentially equal to the specific gravity of water ($\approx 1.0$), and therefore a liquid whose specific gravity is less than 1.0 is to be used as the non-electrically conductive liquid 44, e.g., silicone oil.

In accordance with control signals which are supplied from an external driving circuit (not shown), the TFT circuit 16 of the TFT substrate 10 applies desired voltages between the plurality of unit electrodes 12 and the counter electrode 22, thereby causing the droplet 42 to move.

Figure 3A:
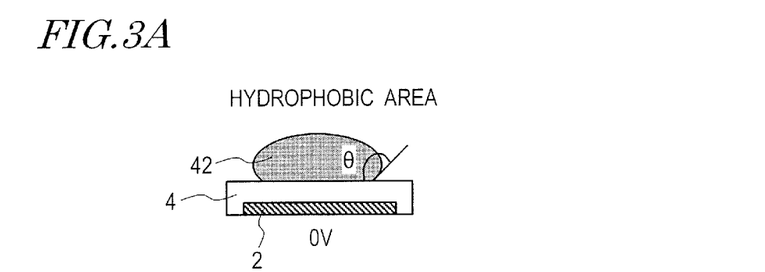
FIG. 3A is a diagram for describing the principle by which a droplet 42 can be moved through electrowetting.
Figure 3B:
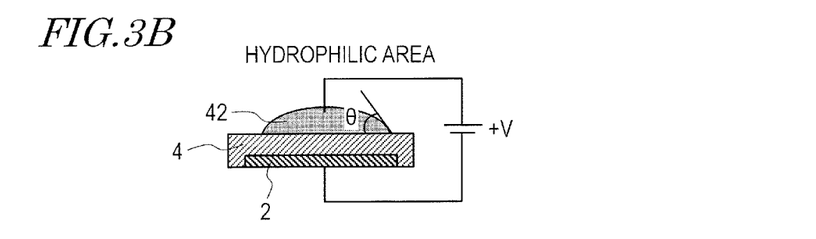
FIG. 3B is a diagram showing the principle by which a droplet 42 can be moved through electrowetting.
Figure 3C:
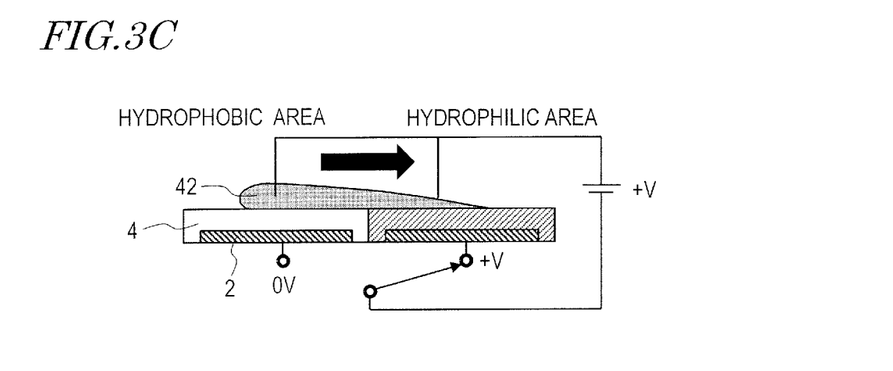
FIG. 3C is a diagram showing the principle by which a droplet 42 can be moved through electrowetting.

Now, with reference to FIGS. 3A, 3B, and 3C, the principle by which a droplet 42 can be moved through electrowetting will be explained.

As has already been described, electrowetting is a phenomenon where a droplet that is placed on a dielectric layer (hydrophobic layer) 4, which is provided above an electrode 2, changes its angle of contact θ with respect to the dielectric layer 4 in response to an electric field being applied thereto. Thus, as illustrated in FIG. 3A, in the absence of applied voltage, the region above the electrode 2 can be regarded as a hydrophobic) (θ>90°) region (hereinafter referred to as a "hydrophobic area"); and, as illustrated in FIG. 3B, under a predetermined voltage (+V), the region above the electrode 2 can be regarded as a hydrophilic (θ<90) region (hereinafter referred to as a "hydrophilic area"). Therefore, as shown in FIG. 3C, when a hydrophobic area and a hydrophilic area adjoin, a droplet 42 which is in the hydrophobic area will move to the hydrophilic area. As this operation is continued, the droplet 42 can be freely moved across the active region.

Figure 4:
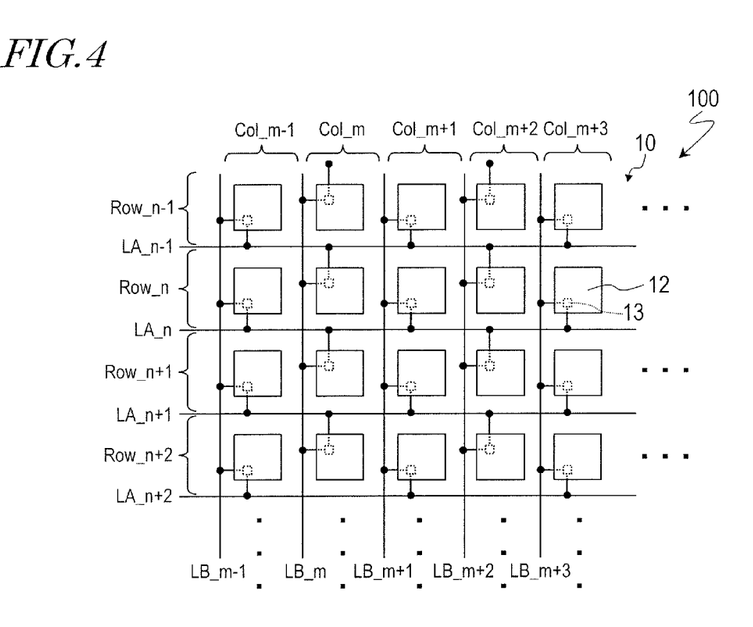
FIG. 4 is a diagram schematically showing the construction of a TFT substrate 10 of an AM-EWOD 100.

With reference to FIG. 4, an arrangement of the plurality of TFTs 13 in the AM-EWOD 100 according to the present embodiment will be described. FIG. 4 is a diagram showing schematically the construction of the TFT substrate 10 of the AM-EWOD 100. In FIG. 4, of the plurality of unit electrodes 12 arrayed in a matrix shape, an $n^{th}$ row is denoted as RoW_n, and an $m^{th}$ column is denoted as Col_m.

As shown in FIG. 4, the TFT substrate 10 further includes a plurality of first wiring lines LA extending along the row direction, and a plurality of second wiring lines LB extending along the column direction. In FIG. 4, for convenience, a first wiring line LA located between an $n^{th}$ row and an $(n+1)^{th}$ row is denoted as LA_n, whereas a second wiring line LB located between an $(m-1)^{th}$ column and an $m^{th}$ column is denoted as LB_m. The plurality of first wiring lines LA are connected to the plurality of TFTs 13. The plurality of second wiring lines LB are also connected to the plurality of TFTs 13.

Herein, the plurality of first wiring lines LA are a plurality of row selection lines that are connected to the gate electrodes 13g of the plurality of TFTs 13. Each row selection line LA supplies a control signal (selection signal) to the corresponding TFT 13. The plurality of second wiring lines LB are a plurality of column write lines that are connected to the source electrodes 13s of the plurality of TFTs 13. Each column write line LB supplies a control signal (write signal) to the corresponding TFT 13.

In the AM-EWOD 100 according to the present embodiment, as shown in FIG. 4, along the row direction, TFTs (of which there are naturally two or more) 13 that are connected to any one of the plurality of row selection lines LA alternately include: TFTs 13 that are connected to the unit electrodes 12 belonging to one of a pair of rows adjoining the one row selection line LA; and TFTs 13 that are connected to the unit electrodes 12 belonging to the other. For example, along the row direction, the plurality of TFTs connected to a row selection line LA_n alternately include: TFTs 13 that are connected to the unit electrodes 12 belonging to the $n^{th}$ row; and TFTs 13 that are connected to the unit electrodes 12 belonging to the $(n+1)^{th}$ row. Similarly, along the row direction, the plurality of TFTs 13 connected to a row selection line LA_n+1 alternately include: TFTs 13 that are connected to the unit electrodes 12 belonging to the (n+1)th row; and TFTs 13 that are connected to the unit electrodes 12 belonging to the (n+2)th row.

Thus, the TFTs 13 are disposed and connected in a staggered fashion for/to each row selection line LA. Hereinafter, such a relative arrangement may be referred to a "staggered arrangement".

In the example shown in FIG. 4, staggered arrangement of TFTs 13 is not applied to the column write lines LB. The only TFTs (of which there are naturally two or more) 13 that are connected to any one of the plurality of column write lines LB are TFTs 13 that are connected to the unit electrodes 12 belonging to one of a pair of columns adjoining the one column write line LB. For example, the only plurality of TFTs 13 connected to a column write line LB_m are TFTs 13 that are connected to the unit electrodes 12 belonging to the $m^{th}$ column.

Figure 5:
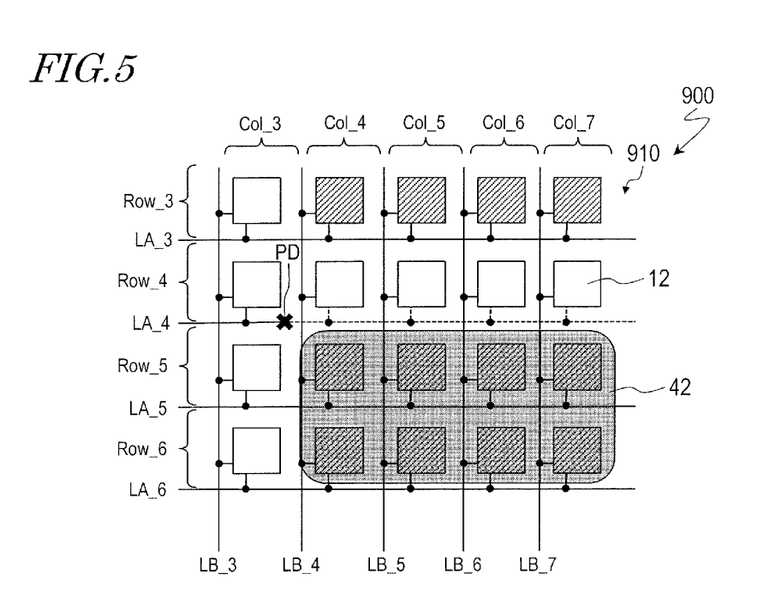
FIG. 5 is a diagram showing the construction of a TFT substrate 910 of an AM-EWOD 900 according to Comparative Example.
Figure 6:
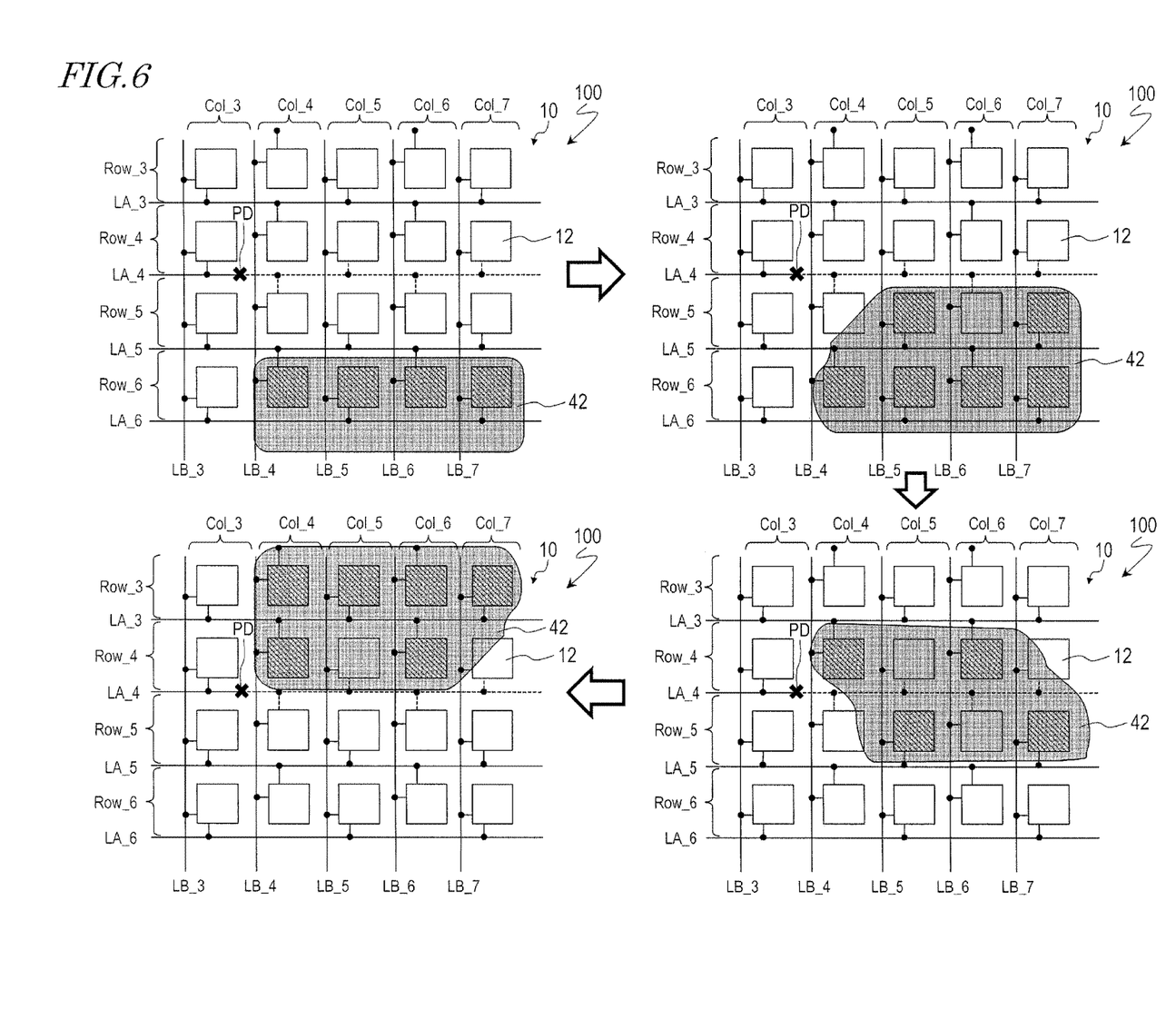
FIG. 6 is a diagram showing how a droplet 42 may move astride a defective line in the AM-EWOD 100.

In the AM-EWOD 100 according to the present embodiment, where staggered arrangement of TFTs 13 is applied to the row selection lines LA, even if a break occurs in a row selection line LA, the droplet 42 can be moved astride the defective line. Hereinafter, this aspect will be described with reference to FIG. 5 and FIG. 6. FIG. 5 is a diagram showing the construction of a TFT substrate 910 of an AM-EWOD 900 of Comparative Example. FIG. 6 is a diagram showing how a droplet 42 may move astride a defective line in the AM-EWOD 100 according to the present embodiment. In FIG. and FIG. 6, those unit electrodes 12 which are shown hatched are meant to be in a hydrophilic area, whereas those unit electrodes 12 which are not shown hatched are meant to be in a hydrophobic area. The TFTs 13 are omitted from illustration in FIG. 5 and FIG. 6.

The AM-EWOD 900 of Comparative Example shown in FIG. 5 differs from the AM-EWOD 100 according to the present embodiment in that staggered arrangement of TFTs 13 is not applied to the row selection lines LA. FIG. 5 illustrates a case a where a break has occurred in a row selection line LA_4. In this case, a signal cannot be supplied from this row selection line LA_4 to the unit electrodes 12 in the $4^{th}$ row, so that the $4^{th}$ row (or, strictly speaking, the area downstream of the break site PD in the $4^{th}$ row) cannot be made into a hydrophilic area. As a result, for a given hydrophilic area in the $5^{th}$ row, no adjoining hydrophilic area can exist in the $4^{th}$ row, which prevents the droplet 42 from moving astride the defective line (row selection line LA_4).

Similarly to FIG. 5, FIG. 6 illustrates a case a where a break has occurred in a row selection line LA_4. First, in a state illustrated in an upper left portion of FIG. 6, the droplet 42 is located at the $6^{th}$ row in the $4^{th}$ through $7^{th}$ columns, which is a hydrophilic area.

Next, in a state illustrated in an upper right portion of FIG. 6, the $5^{th}$ row in the $5^{th}$ column and the $5^{th}$ row in the $7^{th}$ column are a hydrophilic area, so that the droplet 42 has partly moved to the $5^{th}$ row.

Then, in a state illustrated in a lower right portion of FIG. 6, the $6^{th}$ row in the $4^{th}$ through $7^{th}$ columns are now a hydrophobic area, so that the droplet 42 does not exist in the $6^{th}$ row. Moreover, the $4^{th}$ row in the $4^{th}$ column and the $4^{th}$ row in the $6^{th}$ column are now a hydrophilic area, obliquely adjoining the $5^{th}$ row in the $5^{th}$ column and the $5^{th}$ row in the $7^{th}$ column, which are a hydrophilic area. As a result, the droplet 42 has partly moved to the $4^{th}$ row, astride the row selection line LA_4, which is a defective line.

Thereafter, in a state illustrated in a lower left portion of FIG. 6, the $5^{th}$ row in the $5^{th}$ column and the $5^{th}$ row in the $7^{th}$ column are now a hydrophobic area, so that the droplet 42 does not exist in the $5^{th}$ row. Moreover, the $3^{rd}$ row in the $4^{th}$ through $7^{th}$ columns are now a hydrophilic area, adjoining the $4^{th}$ row in the $4^{th}$ column and the $4^{th}$ row in the $6^{th}$ column, which is a hydrophilic area. As a result, the droplet 42 has partly moved to the $3^{rd}$ row.

Thus, in the AM-EWOD 100 according to the present embodiment, the droplet 42 can be moved astride a defective line. Therefore, even if a defective line exists, the droplet 42 can still be moved to a desired region within the active region.

Figure 7:
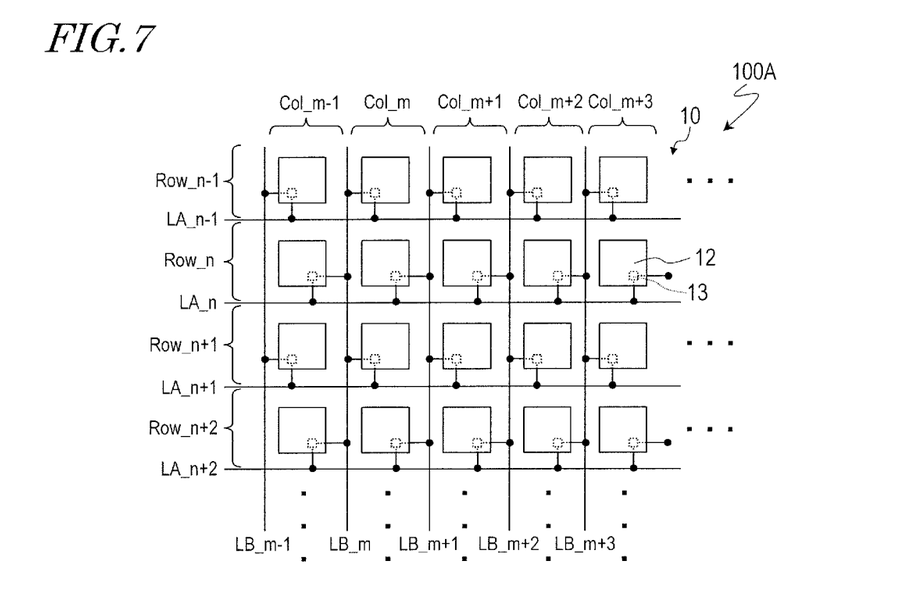
FIG. 7 is a diagram showing schematically showing the construction of a TFT substrate 10 of another AM-EWOD 100A according to an embodiment of the present invention.

With reference to FIG. 7, another AM-EWOD 100A according to the present embodiment will be described. FIG. 7 is a diagram schematically showing the construction of a TFT substrate 10 of the AM-EWOD 100A. The following description will be directed mainly to differences of the AM-EWOD 100A from the AM-EWOD 100 shown in FIG. 4 and the like.

In the AM-EWOD 100A, as shown in FIG. 7, along the column direction, TFTs (of which there are naturally two or more) 13 that are connected to any one of the plurality of column write lines LB alternately include: TFTs 13 that are connected to the unit electrodes 12 belonging to one of a pair of columns adjoining the one column write line LB; and TFTs 13 that are connected to the unit electrodes 12 belonging to the other. For example, along the column direction, the plurality of TFTs 13 connected to a column write line LB_m alternately include: TFTs 13 that are connected to the unit electrodes 12 belonging to the (m−1)th column; and TFTs 13 that are connected to the unit electrodes 12 belonging to the $m^{th}$ column. Similarly, along the column direction, the plurality of TFTs 13 connected to a column write line LB_m+1 alternately include: TFTs 13 that are connected to the unit electrodes 12 belonging to the $m^{th}$ column; and TFTs 13 that are connected to the unit electrodes 12 belonging to the $(m+1)^{th}$ column.

Thus, the TFTs 13 are disposed and connected in a staggered fashion for/to each column write line LB. Note that, staggered arrangement of TFTs 13 is not applied to the row selection lines LA. The only TFTs (of which there are naturally two or more) 13 that are connected to any one of the plurality of row selection lines LA are TFTs 13 that are connected to the unit electrodes 12 belonging to one of a pair of rows adjoining the one row selection line LA. For example, the only plurality of TFTs 13 connected to a row selection line LA_n are TFTs 13 that are connected to the unit electrodes 12 belonging to the $n^{th}$ row.

In the AM-EWOD 100A shown in FIG. 7, where staggered arrangement of TFTs 13 is applied to the column write lines LB, even if a break occurs in a column write line LB, the droplet 42 can be moved astride the defective line.

Figure 8:
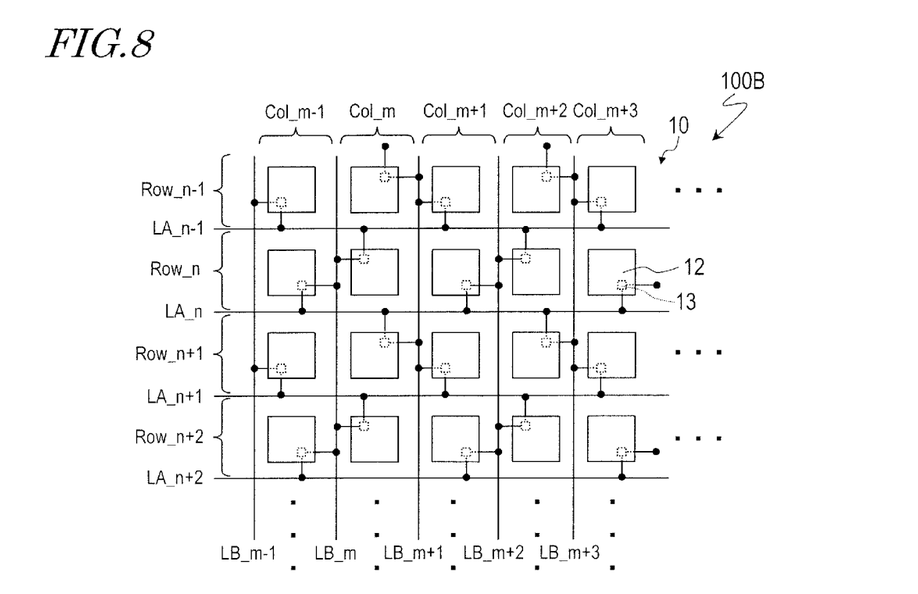
FIG. 8 is a diagram schematically showing the construction of a TFT substrate 10 of still another AM-EWOD 100B according to an embodiment of the present invention.

With reference to FIG. 8, another AM-EWOD 100B according to the present embodiment will be described. FIG. 8 is a diagram schematically showing the construction of a TFT substrate 10 of the AM-EWOD 100B. The following description will be directed mainly to differences of the AM-EWOD 100B from the AM-EWOD 100 shown in FIG. 4 and the like.

In the AM-EWOD 100B, as shown in FIG. 8, along the row direction, TFTs (of which there are naturally two or more) 13 that are connected to any one of the plurality of row selection lines LA alternately include: TFTs 13 that are connected to the unit electrodes 12 belonging to one of a pair of rows adjoining the one row selection line LA; and TFTs 13 that are connected to the unit electrodes 12 belonging to the other. For example, along the row direction, the plurality of TFTs 13 connected to a row selection line LA_n alternately include: TFTs 13 that are connected to the unit electrodes 12 belonging to the $n^{th}$ row; and TFTs 13 that are connected to the unit electrodes 12 belonging to the (n+1)th row. Similarly, along the row direction, the plurality of TFTs 13 connected to a row selection line LA_n+1 alternately include: TFTs 13 that are connected to the unit electrodes 12 belonging to the $(n+1)^{th}$ row; and TFTs 13 that are connected to the unit electrodes 12 belonging to the $(n+2)^{th}$ row.

Moreover, in the AM-EWOD 100B, as shown in FIG. 8, along the column direction, TFTs (of which there are naturally two or more) 13 that are connected to any one of the plurality of column write lines LB alternately include: TFTs 13 that are connected to the unit electrodes 12 belonging to one of a pair of columns adjoining the one column write line LB; and TFTs 13 that are connected to the unit electrodes 12 belonging to the other. For example, along the column direction, the plurality of TFTs 13 connected to a column write line LB_m alternately include: TFTs 13 that are connected to the unit electrodes 12 belonging to the $(m-1)^{th}$ column; and TFTs 13 that are connected to the unit electrodes 12 belonging to the $m^{th}$ column. Similarly, along the column direction, the plurality of TFTs 13 connected to a column write line LB_m+1 alternately include: TFTs 13 that are connected to the unit electrodes 12 belonging to the $m^{th}$ column; and TFTs 13 that are connected to the unit electrodes 12 belonging to the $(m+1)^{th}$ column.

Thus, the TFTs 13 are disposed and connected in a staggered fashion for/to each row selection line LA; also, the TFTs 13 are disposed and connected in a staggered fashion for/to each column write line LB. In the AM-EWOD 100B shown in FIG. 8, where staggered arrangement of TFTs 13 is applied to both the row selection lines LA and the column write lines LB, even if a break occurs in one or both of a row selection line LA and a column write line LB, the droplet 42 can be moved astride the defective line(s).

As described above, by adopting at least one of a staggered arrangement for each row selection line LA and a staggered arrangement for each column write line LB, the droplet 42 can be moved astride a defective line.

Embodiment 2

Figure 9:
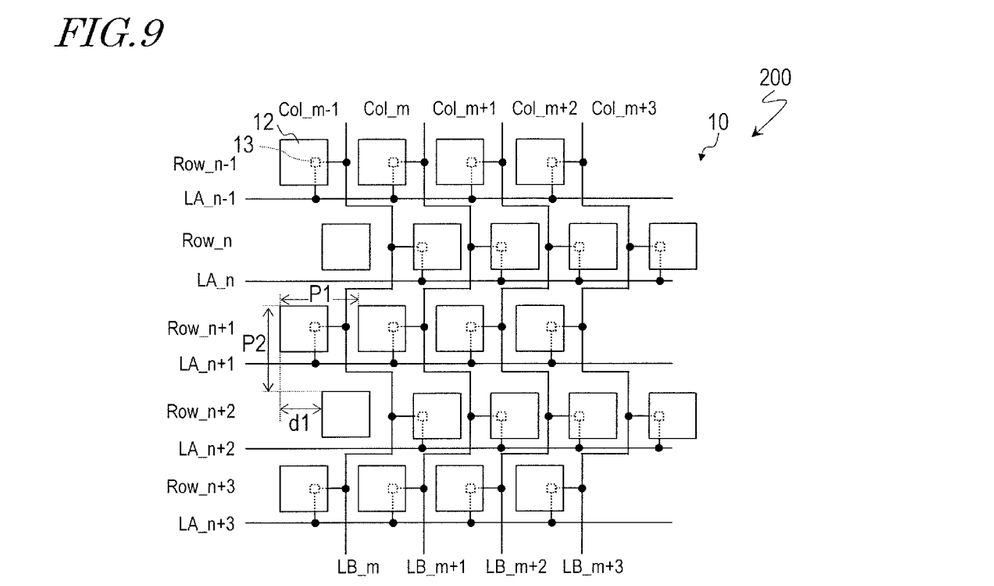
FIG. 9 is a diagram schematically showing the construction of a TFT substrate 10 of still another AM-EWOD 200 according to an embodiment of the present invention.

With reference to FIG. 9, an AM-EWOD 200 according to the present embodiment will be described. FIG. 9 is a diagram schematically showing the construction of a TFT substrate 10 of the AM-EWOD 200. The following description will be directed mainly to differences of the AM-EWOD 200 from the AM-EWODs 100, 100A and 100B according to Embodiment 1.

In the AM-EWOD 200, too, the plurality of unit electrodes 12 are arranged in a matrix shape (array). The plurality of unit electrodes 12 are disposed in each row with a predetermined pitch P1, and disposed in each column with a predetermined pitch P2.

In the AM-EWOD 200, however, the plurality of unit electrodes 12 are disposed in such a manner that the unit electrodes 12 belonging to any odd-numbered row and the unit electrodes 12 belonging to any even-numbered row are mutually shifted along the row direction by a distance d1 which is shorter than the pitch P1. Such an array may sometimes be referred to as a delta array.

In the AM-EWOD 200, as shown in FIG. 9, along the column direction, TFTs (of which there are naturally two or more) 13 that are connected to any one of the plurality of column write lines LB alternately include: TFTs 13 that are connected to the unit electrodes 12 belonging to one of a pair of columns adjoining the one column write line LB; and TFTs 13 that are connected to the unit electrodes 12 belonging to the other. For example, along the column direction, the plurality of TFTs 13 connected to a column write line LB_m alternately include: TFTs 13 that are connected to the unit electrodes 12 belonging to the $(m-1)^{th}$ column; and TFTs 13 that are connected to the unit electrodes 12 belonging to the $m^{th}$ column. Similarly, along the column direction, the plurality of TFTs 13 connected to a column write line LB_m+1 alternately include: TFTs 13 that are connected to the unit electrodes 12 belonging to the $m^{th}$ column; and TFTs 13 that are connected to the unit electrodes 12 belonging to the $(m+1)^{th}$ column.

Thus, the TFTs 13 are disposed and connected in a staggered fashion for/to each column write line LB. Note that, staggered arrangement of TFTs 13 is not applied to the row selection lines LA. The only TFTs (of which there are naturally two or more) 13 that are connected to any one of the plurality of row selection lines LA are TFTs 13 that are connected to the unit electrodes 12 belonging to one of a pair of rows adjoining the one row selection line LA. For example, the only plurality of TFTs 13 connected to a row selection line LA_n are TFTs 13 that are connected to the unit electrodes 12 belonging to the $n^{th}$ row.

In the AM-EWOD 200 according to the present embodiment, since staggered arrangement of TFTs 13 is applied to the column write lines LB, even if a break occurs in a column write line LB, the droplet 42 can be moved astride the defective line.

Figure 10:
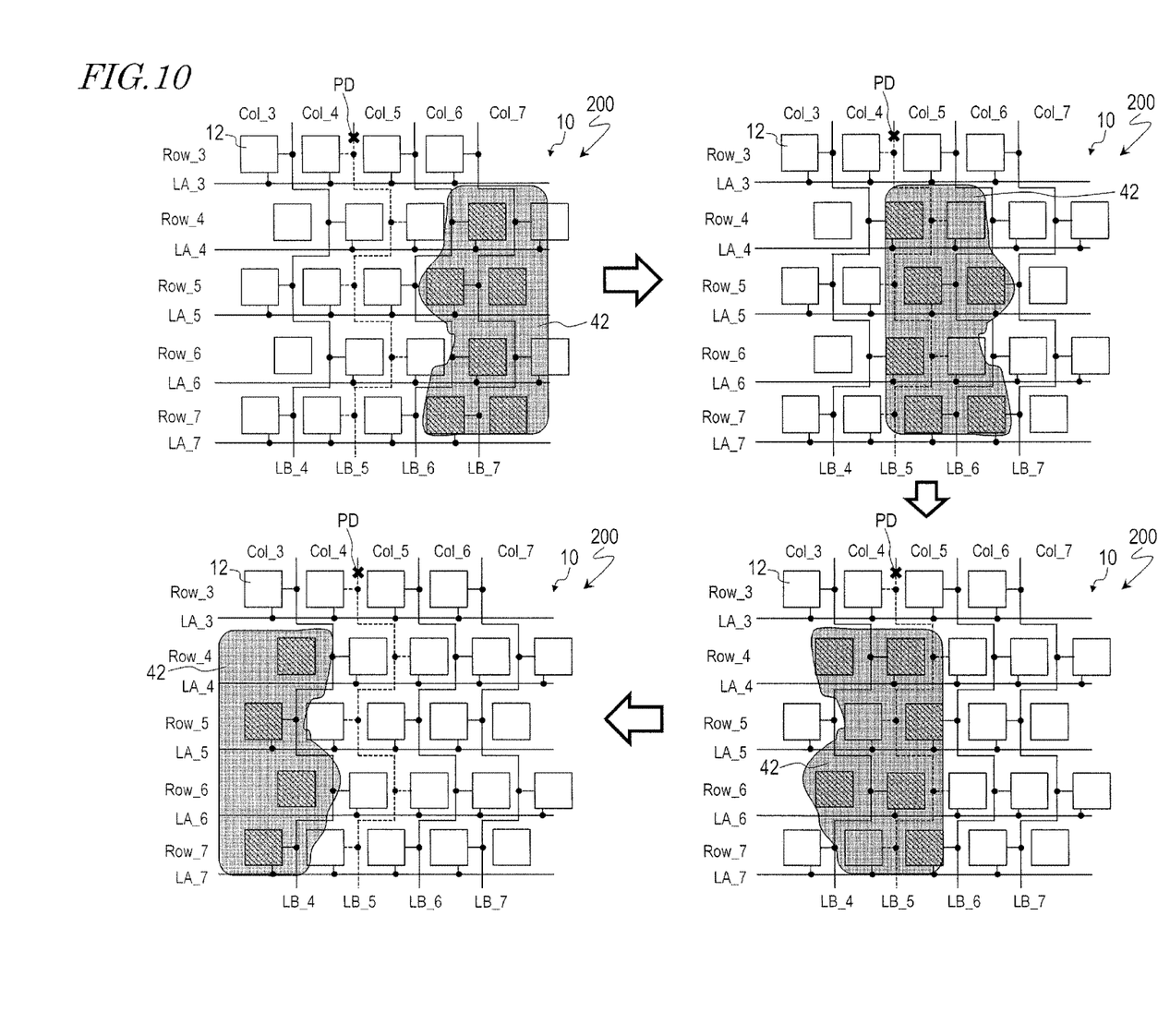
FIG. 10 is a diagram showing how a droplet 42 may move astride a defective line in the AM-EWOD 200.

FIG. 10 is a diagram showing how a droplet 42 may move astride a defective line in the AM-EWOD 200 according to the present embodiment. FIG. 10 illustrates a case a where a break has occurred in a column write line LB_5.

First, in a state illustrated in an upper left portion of FIG. 10, a droplet 42 is located in the $4^{th}$ row in the $6^{th}$ column, the $5^{th}$ row in the $6^{th}$ through $7^{th}$ columns, the $6^{th}$ row in the $6^{th}$ column, and the $7^{th}$ row in the $6^{th}$ through $7^{th}$ columns, which are a hydrophilic area.

Next, in a state illustrated in an upper right portion of FIG. 10, the $4^{th}$ row in the $6^{th}$ column, the $5^{th}$ row in the $7^{th}$ column, the $6^{th}$ row in the $6^{th}$ column, and the $7^{th}$ row in the $7^{th}$ column are now a hydrophobic area, so that the droplet 42 does not exist in these regions. Moreover, the $4^{th}$ row in the $4^{th}$ column, the $5^{th}$ row in the $5^{th}$ column, the $6^{th}$ row in the $4^{th}$ column, and the $7^{th}$ row in the $5^{th}$ column are now a hydrophilic area, so that the droplet 42 has partly moved to these regions. During this move, the droplet strides across the column write line LB_5, which is a defective line.

Then, in a state illustrated in a lower right portion of FIG. 10, the $5^{th}$ row in the $6^{th}$ column and the $7^{th}$ row in the $6^{th}$ column are now a hydrophobic area, so that the droplet 42 does not exist in these regions. Moreover, the $4^{th}$ row in the $3^{rd}$ column and the $6^{th}$ row in the $3^{rd}$ column are now a hydrophilic area, so that the droplet 42 has partly moved to these regions.

Thereafter, in a state illustrated in a lower left portion of FIG. 10, the $4^{th}$ row in the $4^{th}$ column, the $5^{th}$ row in the $5^{th}$ column, the $6^{th}$ row in the $4^{th}$ column, and the $7^{th}$ row in the $5^{th}$ column are now a hydrophobic area, so that the droplet 42 does not exist in these regions. Moreover, the $5^{th}$ row in the $3^{rd}$ column and the $7^{th}$ row in the $3^{rd}$ column are now a hydrophilic area, so that the droplet 42 has partly moved to these regions.

Thus, in the AM-EWOD 200 according to the present embodiment, the droplet 42 can be moved astride a defective line. Therefore, even if a defective line exists, the droplet 42 can still be moved to a desired region within the active region.

Although a construction where staggered arrangement of TFTs 13 is applied to the column write lines LB is illustrated herein, staggered arrangement of TFTs 13 may be applied to the row selection lines LA, or staggered arrangement of TFTs 13 may be applied to both the row selection lines LA and the column write lines LB.

Figure 11:
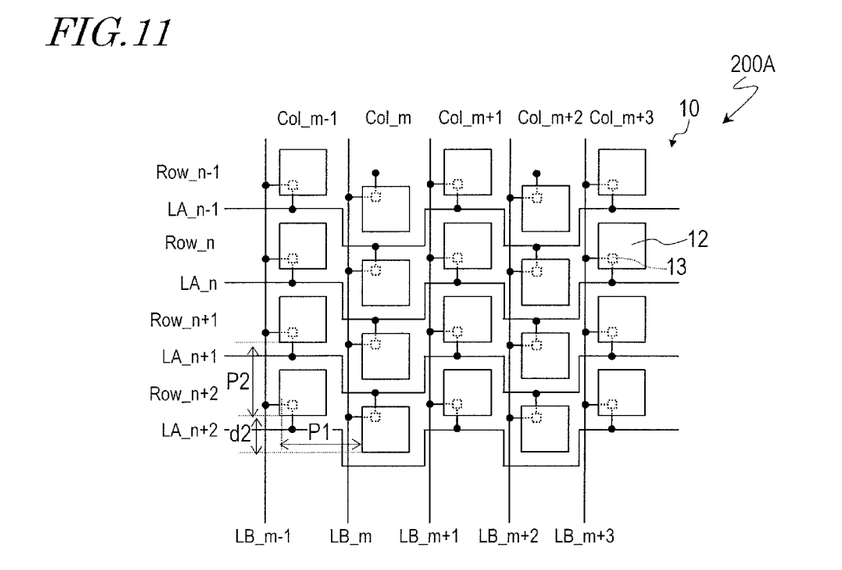
FIG. 11 is a diagram schematically showing the construction of a TFT substrate 10 of still another AM-EWOD 200A according to an embodiment of the present invention.

With reference to FIG. 11, another AM-EWOD 200A according to the present embodiment will be described. FIG. 11 is a diagram schematically showing the construction of a TFT substrate 10 of the AM-EWOD 200A. The following description will be directed mainly to differences of the AM-EWOD 200A from the AM-EWOD 200 shown in FIG. 9 and the like.

In the AM-EWOD 200A, too, the plurality of unit electrodes 12 are arranged in a matrix shape (array). The plurality of unit electrodes 12 are disposed in each row with a predetermined pitch P1, and disposed in each column with a predetermined pitch P2.

In the AM-EWOD 200A, however, as shown in FIG. 11, the plurality of unit electrodes 12 are disposed in such a manner that the unit electrodes 12 belonging to any odd-numbered column and the unit electrodes 12 belonging to any even-numbered column are mutually shifted along the column direction by a distance d2 which is shorter than the pitch P2. Such an array may also be sometimes referred to as a delta array.

Moreover, in the AM-EWOD 200A, as shown in FIG. 11, along the row direction, TFTs (of which there are naturally two or more) 13 that are connected to any one of the plurality of row selection lines LA alternately include: TFTs 13 that are connected to the unit electrodes 12 belonging to one of a pair of rows adjoining the one row selection line LA; and TFTs 13 that are connected to the unit electrodes 12 belonging to the other. For example, along the row direction, the plurality of TFTs 13 connected to a row selection line LA_n alternately include: TFTs 13 that are connected to the unit electrodes 12 belonging to the $n^{th}$ row; and TFTs 13 that are connected to the unit electrodes 12 belonging to the $(n+1)^{th}$ row. Similarly, along the row direction, the plurality of TFTs 13 connected to a row selection line LA_n+1 alternately include: TFTs 13 that are connected to the unit electrodes 12 belonging to the $(n+1)^{th}$ row; and TFTs 13 that are connected to the unit electrodes 12 belonging to the $(n+2)^{th}$ row.

In the AM-EWOD 200A, even when a defective line exists (or more specifically, when a break has occurred in a row selection line LA), the droplet 42 can be moved astride the defective line.

Although a construction where staggered arrangement of TFTs 13 is applied to the row selection lines LA is illustrated for the AM-EWOD 200A herein, staggered arrangement of TFTs 13 may be applied to the column write lines LB, or staggered arrangement of TFTs 13 may be applied to both the row selection lines LA and the column write lines LB.

Embodiment 3

Figure 12:
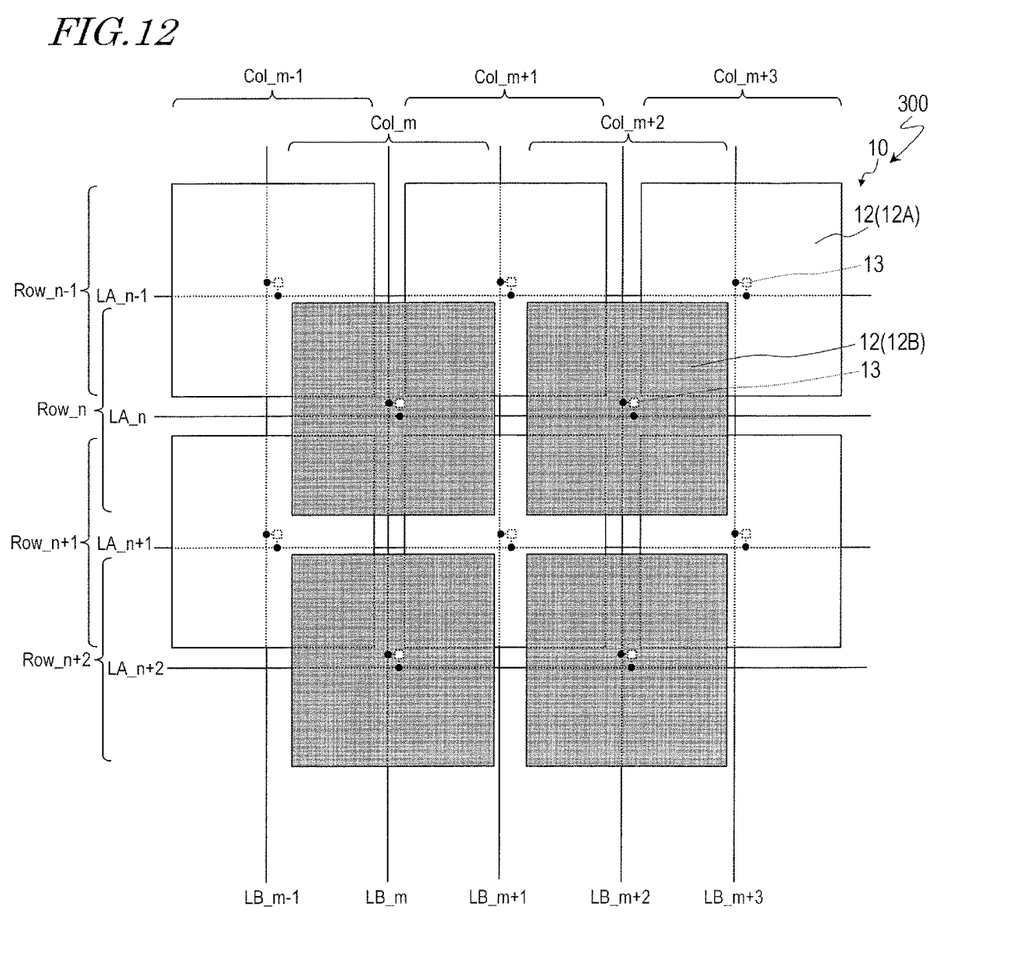
FIG. 12 is a plan view schematically showing the construction of a TFT substrate 10 of still another AM-EWOD 300 according to an embodiment of the present invention.
Figure 13:
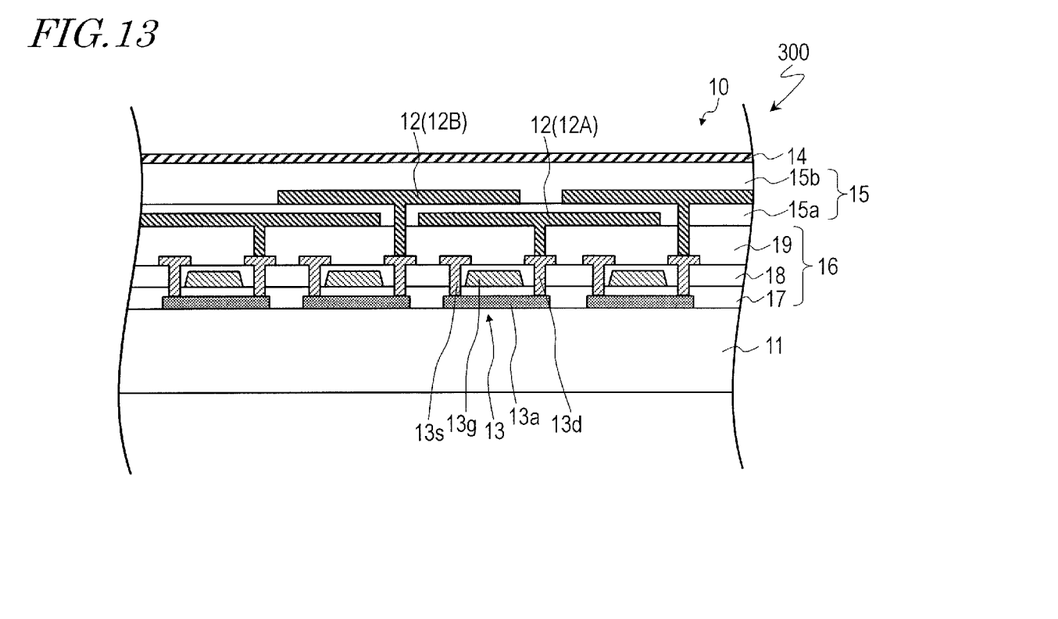
FIG. 13 is a cross-sectional view schematically showing the construction of a TFT substrate 10 of an AM-EWOD 300.

With reference to FIG. 12 and FIG. 13, an AM-EWOD 300 according to the present embodiment will be described. FIG. 12 and FIG. 13 are a plan view and a cross-sectional view, respectively, schematically showing the construction of a TFT substrate 10 of the AM-EWOD 300.

As shown in FIG. 12 and FIG. 13, in the AM-EWOD 300 according to the present embodiment, a plurality of unit electrodes 12 are disposed in such a manner that any two adjacent unit electrodes 12 neighboring along an oblique direction (a direction which is inclined with respect to the row direction and the column direction) partially overlap each other via an insulating layer (first dielectric layer) 15a. For example, the unit electrode 12 at an $(n-1)^{th}$ row in an $(m-1)^{th}$ column and the unit electrode 12 at an $n^{th}$ row in an $m^{th}$ column partially overlap each other via the first dielectric layer 15a. Similarly, the unit electrode 12 at an $n^{th}$ row in an $m^{th}$ column and the unit electrode 12 at an $(n+1)^{th}$ row in an $(m+1)^{th}$ column partially overlap each other via the first dielectric layer 15a.

In the present embodiment, as shown in FIG. 13, the dielectric layer 15 has a multilayer structure including the first dielectric layer 15a and a second dielectric layer 15b provided on the first dielectric layer 15a. Some of the unit electrodes (which may hereinafter be referred to as "lower-layer unit electrodes") 12A among the plurality of unit electrodes 12 are covered with the first dielectric layer 15a, while other unit electrodes (which may hereinafter be referred to as "upper-layer unit electrodes") 12B are provided on the first dielectric layer 15a. The second dielectric layer 15b covers the upper-layer unit electrode 12B. In the present embodiment, lower-layer unit electrodes 12A and upper-layer unit electrodes 12B are alternately disposed along the oblique direction, such that the adjacent lower-layer unit electrode 12A and upper-layer unit electrode 12B partially overlap each other via the first dielectric layer 15a.

By disposing the plurality of unit electrodes 12 in this manner, unit electrodes 12 belonging to two rows that are adjacent to each given row can be placed close to each other. For example, regarding an $(n-1)^{th}$ row and an $(n+1)^{th}$ row (which are two rows adjacent to an $n^{th}$ row), the unit electrodes 12 belonging to the $(n-1)^{th}$ row and the unit electrodes 12 belonging to the $(n+1)^{th}$ row are close to each other. Therefore, when a break occurs in a row selection line LA corresponding to a given row, two rows that are adjacent to that row may be turned into a hydrophilic area, whereby the droplet 42 can be moved astride the defective line.

Moreover, by disposing the plurality of unit electrodes 12 in the aforementioned manner, unit electrodes 12 belonging to two columns that are adjacent to each given column can be placed close to each other. For example, regarding an $(m-1)^{th}$ column and an $(m+1)^{th}$ column (which are two columns that are adjacent to an $m^{th}$ column), the unit electrodes 12 belonging to the $(m-1)^{th}$ column and the unit electrodes 12 belonging to the $(m+1)^{th}$ column are close to each other. Therefore, when a break occurs in a column write line LB corresponding to a given column, two columns that are adjacent to that column may be turned into a hydrophilic area, whereby the droplet 42 can be moved astride the defective line.

Figure 14:
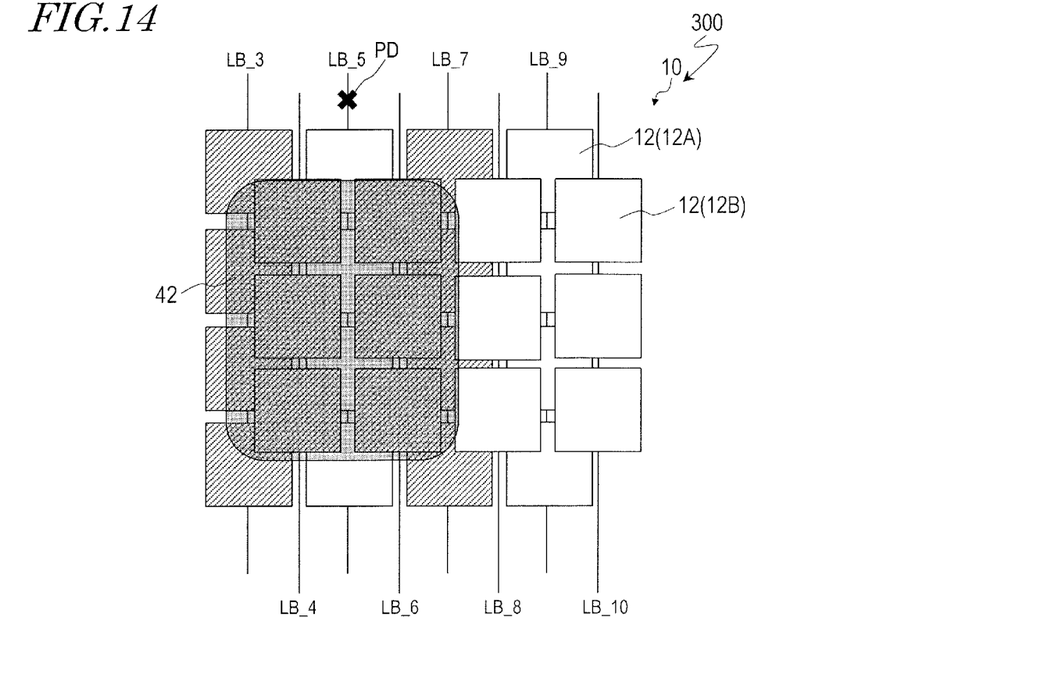
FIG. 14 is a diagram showing a break occurring in a column write line LB_5 of the AM-EWOD 300.

FIG. 14 shows a case where a break has occurred in a column write line LB_5. In this case, a desired voltage cannot be applied to the unit electrodes 12 that are connected to the defective column write line LB_5, so that the 5$^{th}$ column cannot be turned into a hydrophilic area. However, by turning the 4$^{th}$ column and the 6$^{th}$ column into a hydrophilic area, as shown in FIG. 14, the droplet 42 can be placed in the 4,h through 6$^{th}$ columns, whereby the droplet 42 can be moved astride the defective line (column write line LB_5).

Although an example has been illustrated where the plurality of unit electrodes 12 are disposed in such a manner that any two adjacent unit electrodes 12 neighboring along an oblique direction partially overlap each other via the insulating layer (first dielectric layer) 15a, the arrangement of the plurality of unit electrodes 12 is not limited thereto.

The plurality of unit electrodes 12 may be disposed in such a manner that any two adjacent unit electrodes 12 neighboring along the row direction partially overlap each other via the insulating layer (first dielectric layer) 15a. In other words, lower-layer unit electrodes 12A and upper-layer unit electrodes 12B may alternate along the row direction, such that the adjacent lower-layer unit electrode 12A and upper-layer unit electrode 12B partially overlap each other via the insulating layer. By disposing the plurality of unit electrodes 12 in this manner, the unit electrodes 12 belonging to two columns that are adjacent to a given column can be placed close to each other. Therefore, if a break occurs in a column write line LB corresponding to a given column, two columns that are adjacent to that column may be turned into a hydrophilic area, whereby the droplet 42 can be moved astride the defective line.

Alternatively, the plurality of unit electrodes 12 may be disposed in such a manner that any two adjacent unit electrodes 12 neighboring along the column direction partially overlap each other via the insulating layer (first dielectric layer) 15a. In other words, lower-layer unit electrodes 12A and upper-layer unit electrodes 12B may alternate along the column direction, such that the adjacent lower-layer unit electrode 12A and upper-layer unit electrode 12B partially overlap each other insulating layer. By disposing the plurality of unit electrodes 12 in this manner, the unit electrodes 12 belonging to two rows that are adjacent to a given row can be placed close to each other. Therefore, if a break occurs in a row selection line LA corresponding to a given row, two rows that are adjacent to that row may be turned into a hydrophilic area, whereby the droplet 42 can be moved astride the defective line.

Embodiments of the present invention are broadly applicable to electrowetting devices. Electrowetting devices according to embodiments of the present invention may suitably be used for a fluid sensor utilizing CGS (Continuous Grain Silicon) TFTs, for example.

The present application claims the benefit of U.S. Provisional Application No. 62/798,204 filed on Jan. 29, 2019, the disclosure of which is hereby incorporated by reference in its entirety.

What is claimed is:

1. An electrowetting device comprising:
an active matrix substrate; and
a counter substrate opposed to the active matrix substrate via a predetermined gap,
the active matrix substrate including:
a first substrate;
a plurality of first electrodes disposed on the first substrate, the plurality of first electrodes being arranged in a matrix shape including a plurality of rows and a plurality of columns;
a plurality of TFTs respectively connected to the plurality of first electrodes; and
a first hydrophobic layer disposed on the plurality of first electrodes,
the counter substrate including:
a second substrate;
a second electrode disposed on the second substrate; and
a second hydrophobic layer disposed on the second electrode,
the active matrix substrate further including:
a plurality of first wiring lines extending along a row direction, the plurality of first wiring lines being connected to the plurality of TFTs; and
a plurality of second wiring lines extending along a column direction, the plurality of second wiring lines being connected to the plurality of TFTs, wherein,
the plurality of TFTs are disposed so as to have at least one of a first relative arrangement and a second relative arrangement,
the first relative arrangement being defined as a relative arrangement where two or more TFTs that are connected to any one of the plurality of first wiring lines alternately include, along the row direction: TFTs that are connected to the first electrodes belonging to one of a pair of rows adjoining the one first wiring line; and TFTs that are connected to the first electrodes belonging to the other row;
the second relative arrangement being defined as a relative arrangement where two or more TFTs that are connected to any one of the plurality of second wiring lines alternately include, along the column direction: TFTs that are connected to the first electrodes belonging to one of a pair of columns adjoining the one second wiring line; and TFTs that are connected to the first electrodes belonging to the other column.

2. The electrowetting device of claim 1, wherein,
each of the plurality of TFTs includes a gate electrode, a source electrode, and a drain electrode; and
the plurality of first wiring lines are a plurality of row selection lines that are connected to the gate electrodes of the plurality of TFTs, and the plurality of second wiring lines are a plurality of column write lines that are connected to the source electrodes of the plurality of TFTs.

3. The electrowetting device of claim 1, wherein the plurality of TFTs are disposed so as to have only one of the first relative arrangement and the second relative arrangement.

4. The electrowetting device of claim 1, wherein the plurality of TFTs are disposed so as to have both of the first relative arrangement and the second relative arrangement.

5. The electrowetting device of claim 1, wherein,
the plurality of first electrodes are disposed in each row with a predetermined first pitch P1, and disposed in each column with a predetermined second pitch P2; and
the plurality of first electrodes are disposed in such a manner that the first electrodes belonging to any odd-numbered row and the first electrodes belonging to any even-numbered row are mutually shifted along the row direction by a distance which is shorter than the first pitch P1, or that the first electrodes belonging to any odd-numbered column and the first electrodes belonging to any even-numbered column are mutually shifted along the column direction by a distance which is shorter than the second pitch P2.

6. An electrowetting device comprising:
an active matrix substrate; and
a counter substrate opposed to the active matrix substrate via a predetermined gap,
the active matrix substrate including:
a first substrate;
a plurality of first electrodes disposed on the first substrate;
a plurality of TFTs respectively connected to the plurality of first electrodes; and
a first hydrophobic layer disposed on the plurality of first electrodes,
the counter substrate including:
a second substrate;
a second electrode disposed on the second substrate; and
a second hydrophobic layer disposed on the second electrode,
the active matrix substrate further including:
a plurality of first wiring lines extending along a row direction, the plurality of first wiring lines being connected to the plurality of TFTs; and
a plurality of second wiring lines extending along a column direction, the plurality of second wiring lines being connected to the plurality of TFTs, wherein,
the plurality of first electrodes are disposed in such a manner that any two adjacent first electrodes neighboring along a row direction, a column direction, or an oblique direction that is inclined with respect to the row direction and the column direction partially overlap each other via an insulating layer.

7. The electrowetting device of claim 6, wherein the plurality of first electrodes are disposed in such a manner that any two adjacent first electrodes neighboring along the row direction or the column direction partially overlap each other via the insulating layer.

8. The electrowetting device of claim 6, wherein the plurality of first electrodes are disposed in such a manner that any two adjacent first electrodes neighboring along the oblique direction partially overlap each other via the insulating layer.

* * * * *